(12) United States Patent
Cyster (10) Patent No.: US 8,719,363 B2
(45) Date of Patent: May 6, 2014

(54) PRESENTATION OF SECONDARY LOCAL CONTENT IN A REGION OF A WEB PAGE AFTER AN ELAPSED TIME

(75) Inventor: Thomas Mark Cyster, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1135 days.

(21) Appl. No.: 11/583,216

(22) Filed: Oct. 18, 2006

(65) Prior Publication Data

US 2007/0088805 A1    Apr. 19, 2007

Related U.S. Application Data

(60) Provisional application No. 60/728,813, filed on Oct. 19, 2005.

(51) Int. Cl.
*G06F 15/16* (2006.01)

(52) U.S. Cl.
USPC ............. 709/217; 707/10; 709/219; 709/223; 709/227; 715/203; 715/234; 715/243; 715/205; 345/428; 725/91; 705/14

(58) Field of Classification Search
USPC ............ 709/217, 223, 227, 238, 219; 707/10; 715/203, 234–243, 205, 768; 345/428; 705/14, 14.68; 725/91
See application file for complete search history.

(56) References Cited

U.S. PATENT DOCUMENTS

| | | | | |
|---|---|---|---|---|
| 5,003,591 A | * | 3/1991 | Kauffman et al. | 380/232 |
| 5,895,454 A | * | 4/1999 | Harrington | 705/26 |
| 6,144,996 A | * | 11/2000 | Starnes et al. | 709/217 |
| 6,237,022 B1 | * | 5/2001 | Bruck et al. | 709/201 |
| 6,397,246 B1 | * | 5/2002 | Wolfe | 709/217 |
| 6,487,538 B1 | * | 11/2002 | Gupta et al. | 705/14.66 |
| 6,535,880 B1 | * | 3/2003 | Musgrove et al. | 707/10 |
| 6,571,217 B1 | * | 5/2003 | Anderson et al. | 705/14.68 |
| 6,697,360 B1 | * | 2/2004 | Gai et al. | 370/389 |
| 6,718,390 B1 | * | 4/2004 | Still et al. | 709/229 |

(Continued)

OTHER PUBLICATIONS

Starner, J. and Asplund, L. 2004. Measuring the cache interference cost in preemptive real-time systems. In Proceedings of the 2004 ACM SIGPLAN/SIGBED Conference on Languages, Compilers, and Tools for Embedded Systems (Washington, DC, USA, Jun. 11-13, 2004). LCTES '04. ACM, New York, NY, 146-154.*

(Continued)

*Primary Examiner* — Anthony Mejia
(74) *Attorney, Agent, or Firm* — Kilpatrick Townsend & Stockton LLP (57) ABSTRACT

Display of a webpage or similar file may require content from a remote source (i.e., content stored in a memory not associated with the device on which the webpage is being displayed). In cases where that remote content is unavailable or unusually slow in being provided, or the display system is unable to display the remote content (e.g., required features are disabled or not present), secondary local content provided with the webpage file may be displayed in its place. Upon requesting the remote content a timer is started. If the remote content is not available by the expiration of the timer, the secondary local content is displayed in its place. The secondary local content may be of similar type to the remote content, e.g., targeted merchandising, as determined by the webpage author.

15 Claims, 5 Drawing Sheets

(56) References Cited

U.S. PATENT DOCUMENTS

| | | | |
|---|---|---|---|
| 6,763,386 B2* | 7/2004 | Davis et al. .................. 709/224 |
| 6,892,354 B1* | 5/2005 | Servan-Schreiber et al. . 715/733 |
| 6,912,571 B1* | 6/2005 | Serena .......................... 709/224 |
| 6,950,101 B2* | 9/2005 | Hunt et al. .................... 345/428 |
| 7,120,871 B1* | 10/2006 | Harrington ................... 715/205 |
| 7,216,154 B1* | 5/2007 | Chow et al. .................. 709/219 |
| 7,228,493 B2* | 6/2007 | Kosak et al. ................. 715/234 |
| 7,304,572 B2* | 12/2007 | Sheynman et al. ...... 340/539.14 |
| 7,325,042 B1* | 1/2008 | Soscia et al. ................. 709/219 |
| 7,325,188 B1* | 1/2008 | Covington et al. ........... 715/234 |
| 7,330,894 B2* | 2/2008 | Vallone ......................... 709/227 |
| 7,346,606 B2* | 3/2008 | Bharat .............................. 707/3 |
| 7,458,023 B2* | 11/2008 | Kurumatani .................. 715/242 |
| 7,587,393 B2* | 9/2009 | Battagin et al. ..................... 1/1 |
| 7,594,003 B2* | 9/2009 | Davidson et al. ............ 709/219 |
| 7,729,946 B2* | 6/2010 | Chu .......................... 705/26.61 |
| 7,865,569 B1* | 1/2011 | Tock et al. .................... 709/217 |
| 7,921,135 B2* | 4/2011 | Roche et al. .................. 707/802 |
| 7,966,400 B2* | 6/2011 | Brown et al. ................. 709/225 |
| 8,386,315 B1* | 2/2013 | Bala et al. .................. 705/14.43 |
| 8,554,628 B1* | 10/2013 | Morris et al. .............. 705/14.73 |
| 2001/0025305 A1* | 9/2001 | Yoshiasa ....................... 709/218 |
| 2002/0010757 A1* | 1/2002 | Granik et al. ................. 709/218 |
| 2002/0035595 A1* | 3/2002 | Yen et al. ...................... 709/203 |
| 2002/0052925 A1* | 5/2002 | Kim et al. ..................... 709/217 |
| 2002/0069105 A1* | 6/2002 | do Rosario Botelho et al. .............................. 705/14 |
| 2002/0077900 A1* | 6/2002 | Thompson et al. ............. 705/14 |
| 2002/0083145 A1* | 6/2002 | Perinpanathan .............. 709/213 |
| 2002/0091762 A1* | 7/2002 | Sohn et al. .................... 709/203 |
| 2002/0103905 A1* | 8/2002 | Subramaniam ............... 709/225 |
| 2002/0143630 A1* | 10/2002 | Steinman et al. ............... 705/14 |
| 2002/0143952 A1* | 10/2002 | Sugiarto et al. .............. 709/227 |
| 2003/0081246 A1* | 5/2003 | Simpson et al. ............. 358/1.15 |
| 2004/0187027 A1* | 9/2004 | Chan .............................. 713/201 |
| 2004/0205149 A1* | 10/2004 | Dillon et al. .................. 709/217 |
| 2005/0021851 A1* | 1/2005 | Hamynen ...................... 709/245 |
| 2005/0033824 A1* | 2/2005 | Takahashi et al. ............ 709/217 |
| 2005/0044003 A1* | 2/2005 | O'Keeffe et al. ............... 705/26 |
| 2005/0131992 A1* | 6/2005 | Goldstein et al. ............ 709/202 |
| 2005/0144254 A1* | 6/2005 | Kameda ........................ 709/217 |
| 2005/0149880 A1* | 7/2005 | Postrel .......................... 715/808 |
| 2005/0188053 A1* | 8/2005 | Shimamura et al. .......... 709/217 |
| 2005/0188403 A1* | 8/2005 | Kotzin ............................ 725/47 |
| 2005/0192873 A1* | 9/2005 | Roche et al. ................... 705/27 |
| 2005/0240732 A1* | 10/2005 | Crick et al. ................... 711/133 |
| 2005/0285734 A1* | 12/2005 | Sheynman et al. ...... 340/539.21 |
| 2006/0047775 A1* | 3/2006 | Bruck et al. .................. 709/217 |
| 2006/0122904 A1* | 6/2006 | Shafron et al. ................. 705/26 |
| 2006/0179133 A1* | 8/2006 | Mariani et al. ............... 709/223 |
| 2006/0224711 A1* | 10/2006 | Engel et al. ................... 709/223 |
| 2007/0005428 A1* | 1/2007 | Jacobs et al. ................... 705/14 |
| 2007/0005429 A1* | 1/2007 | Jacobs et al. ................... 705/14 |
| 2007/0033531 A1* | 2/2007 | Marsh ........................... 715/738 |
| 2007/0038950 A1* | 2/2007 | Taniguchi et al. ............ 715/768 |
| 2007/0088801 A1* | 4/2007 | Levkovitz et al. ............ 709/217 |
| 2007/0100964 A1* | 5/2007 | Davies et al. ................. 709/217 |
| 2007/0106763 A1* | 5/2007 | Blumenau .................... 709/219 |
| 2007/0110397 A1* | 5/2007 | Tanikawa et al. ............. 386/95 |
| 2007/0185877 A1* | 8/2007 | Che et al. ........................ 707/10 |
| 2007/0233898 A1* | 10/2007 | Raviv et al. ................... 709/238 |
| 2008/0120418 A1* | 5/2008 | DePree ......................... 709/227 |
| 2009/0019506 A1* | 1/2009 | Lukins et al. ................. 725/109 |
| 2009/0025047 A1* | 1/2009 | Choi et al. ...................... 725/91 |
| 2009/0276716 A1* | 11/2009 | Chua ............................. 715/744 |

OTHER PUBLICATIONS

Erenkrantz, J. R., Gorlick, M., Suryanarayana, G., and Taylor, R. N. 2007. From representations to computations: the evolution of web architectures. In proceedings of the the 6th Meeting of the European Software Engineering Conference and the ACM SIGSOFT Symposium on the Foundations of Software Engineering (Dubrovnik, Croatia, Sep. 3-7, 2007).*

W3C. "HTML 4.01 Specification W3C Proposed Recommendation." (1999): 1-389. Print.*

* cited by examiner

PRESENTATION OF SECONDARY LOCAL CONTENT IN A REGION OF A WEB PAGE AFTER AN ELAPSED TIME

CROSS-REFERENCE TO RELATED APPLICATIONS

The present application is related to application for United States Letters Patent bearing Ser. No. 10/789,665, filed Feb. 27, 2004, and entitled "Method and System for Collecting Online Merchandising Data," now U.S. Pat. No. 7,921,135, which is herein incorporated by reference for all purposes. The present application claims the benefit of provisional U.S. Applications for Letters Patent bearing Ser. No. 60/728,813, filed Oct. 19, 2005, and entitled "Method And System For Presenting Default Content On A Web Page", which is incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

This invention relates generally to a method and system for presenting default content on a web page in an area designated for displaying externally provided content. More particularly, the invention relates to a method and system for presenting default content on a web page in an area designated for displaying externally provided content when such externally provided content is otherwise not displayable.

2. Description of the Prior Art

The Internet provides both an attractive opportunity and a challenge to advertisers and merchandisers. The very large number of users of the Internet today provide a large audience for relatively low cost product and service offerings. However, the relative anonymity of a users presence and the exceedingly large number of users on the internet means that targeting advertising to individuals most likely interested in the product or service being offered is very difficult. To address this challenge, methods and systems have been developed which identify from a user's activities, products and services related to those activities in which the user may specifically be interested. Such methods and systems include those that provide advertising based on user profiles and those that provide advertising in response to a search engine query. As an example of the later case, a user may visit a web search engine's webpage to enter a search query. The search results returned by the search engine may occupy the main area on the displayed webpage. Another area, often located to the side of the main frame, displays advertising information such as text, links, and images for products which might be related to the search results.

Those cases in which an area of the webpage is populated by content from a second server (e.g., a third party server) pose a special problem. If, for some reason, the content from the second server is not displayable, for example if the connection to the second server is impaired due to a slow or unavailable connection, the webpage may fail to load, or at best, rendering of the webpage will be incomplete. This results in lost merchandising opportunity, and presents a partially rendered and unattractive webpage to the purchaser, possibly affecting future business.

Accordingly, there is a need for a method and system that contemplates those cases in which content intended to be rendered on a webpage is not displayable. More specifically, there is a need for a method and system which allows a webpage provided by a first server to appear fully rendered when content required to complete a section of a webpage comes from a second server that is slow in responding, unavailable, responds in an incompatible format or for some other reason cannot be displayed.

SUMMARY OF THE INVENTION

Accordingly, the present invention is directed to a system and method for providing secondary local content to selected fields of a webpage for display on a user's computer in the event that receipt of remote content for such fields is delayed or unavailable. The remote content may include advertising related to products displayed on a primary area of the webpage, and/or advertising related to determined interests of the user. The remote content may be authored or selected by an entity other than the author of the webpage, whereas the secondary local content typically include advertising originated by the author of the webpage.

More specifically, a definition of a webpage may be delivered to a user's computer from a webpage server. The webpage definition may include primary local content (local because it is delivered to a user together with the definition of the webpage) and may require that additional content for certain fields, and the definition of certain attributes of those fields, be obtained from a server(s) other than the webpage server. Content (and related attributes) required to be obtained from a server other than the webpage server is referred to herein as remote content. Primary local content may be displayed in a primary area of the webpage, whereas the remote content may be displayed in a secondary area of the webpage (e.g., beside the primary area).

According to one aspect of the present invention, upon making a request for remote content, software on the user's computer causes a timer to start. If the requested remote content is not received within a designated time, as measured by the timer, secondary local content, which is delivered to the user's computer together with the webpage definition and primary local content from the webpage server, is displayed in place of the remote content in the location in which the remote content would otherwise have been displayed. There is little noticeable delay to a user in displaying the secondary local content in place of the remote content, and to the user it appears as though the secondary local content was the intended content. If the remote content arrives after the secondary local content is displayed, the remote content may be ignored.

According to another implementation of the invention, if the requested content is not received within a designated time, as measured by the timer, secondary local content is displayed in place of the remote content in the location in which the remote content would otherwise have been displayed, and when the remote content is actually obtained, the secondary local content is replaced with the remote content. The manner in which the remote content is made to replace the secondary local content may be controlled such that the transition appears acceptable to a user.

According to some embodiments, provided is a method of serving a webpage, comprising: receiving a request from a display device for a file containing a definition of the webpage, and sending to the display device, in response to the request, one or more files containing a definition of the webpage, said definition comprising primary local content to be displayed in a first portion of the webpage and instructions to cause said display device to request from a first predetermined storage location first remote content to be displayed in a second portion of the webpage, to request from a second predetermined storage location second remote content to be displayed in said second portion of the webpage in the event the first predetermined storage location is unavailable.

These and other aspects of the present invention may be implemented as software objects which may optionally be included in the definition of a webpage. In practice, such objects are included in the definition of the webpage, for example as Javascript or similar code, together with the secondary local content, or a pointer to the secondary local content on the webpage server. No other modification to the webpage is required, meaning that implementation of the present invention is convenient and cost-effective for a webpage owner (e.g., a seller of goods or services via a webpage).

The above is a summary of a number of the unique aspects, features, and advantages of the present invention. However, this summary is not exhaustive. Thus, these and other aspects, features, and advantages of the present invention will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION OF THE INVENTION

Following is a detailed description of a number of embodiments of the present invention. Various features of the invention, including specific implementations thereof, are described in terms of these embodiments. The following definitions will assist in the understanding of the present invention:

The terms "product" as used herein is intended in its most general sense to be an item, whether physical or digital, a service, or static or dynamic data having one or more of a variety of attributes (e.g., operable software code, values to be operated on by software, etc.) It is also intended that the term "product" generally mean something that may be purchased, leased, rented, licensed, exchanged, etc., as well as its record or description within a database (e.g., a mobile phone's description within a products database.) A more specific meaning may be implied by context. The term "item" is used in the same manner.

"Content" means information at least partially intended for display on a processor-based display device, including software, executable instructions, scripts, definitions of images, text, addresses and pointers, material both displayable and not displayable by the display application, and other digital material. The term may also include instructions which cause the display to behave in a certain manner, either visible or not visible to a user. The term is independent of the nature of the display device, which may for example be a computer, television, cellular telephone, personal digital assistant (PDA), etc., capable of presenting visible, audible or tactile information to a user. The term is also independent of the application used to display it, such as web browser, dedicated application, etc. "Remote content" means content capable of being delivered for use by a display application together with primary and secondary local content (defined below), which is stored on a device other than the device from which the primary and secondary local content is obtained and other than the device on which the display application is resident. "Primary local content" and "secondary local content" mean content delivered to a display device together with the definition of a webpage or similar file within which the primary local content and secondary local content are intended to be displayed.

The terms "product information" and "product data" will be used to refer generally to data that is inherently related to a product and its attributes, such as product name, SKU number, price, description, photograph, product family or style, etc. The term "customer response information" refers to data that is obtained or derived from customer buying and browsing activities, such as number of times a product is viewed, number of times the product is purchased, number of times conversions occurred (e.g., sales or click-throughs), buyer segment association, and other products associated with the displayed product by virtue of being purchased together, customer reviews, etc. The term "customer response information" may also refer to data that relates to promotional offers, and may also refer to shopper-specific data such as those indicating frequency of visit, impressions of other products by a shopper, etc. The term "customer response information" sometimes may refer to data that is not product information. The terms "merchandising product data" or "merchandising data" refer to data that may be relevant to or useful to merchandising activities and may include, but not limited to, product information, customer response information, and/or other data.

The various features of the invention set forth herein may be embodied within a wide range of different types of computer systems, including desktop or portable personal computers, cable television systems, satellite television systems, wireless devices (including laptop computers, wireless telephones, and personal digital assistants), and systems in which information is conveyed to users by synthesized voice. In addition, the output medium is demonstrated herein as an Internet client (e.g., Web browser application), but could also include a dedicated user interface, adjunct to another special purpose software application, retail point of sale, videogame, television, or other digital media device. Thus, it should be understood that the HTML webpage-based implementations described herein illustrate just one type of system in which features of the invention may be used.

An embodiment of the invention may be implemented in the form of elements of software, which optionally may be included with a file or software defining a particular webpage or set of webpages. For example, with reference to FIG. 1, portions of such a file 100 are illustrated. The elements may be authored and included in a webpage definition by the author of the webpage, or may be provided by a third-party service provider pursuant to a variety of arrangements such as one-time element creation or an update or subscription basis. According to the present invention, a webpage author need make only minor additions to its webpage to employ the present invention.

Figure 1:
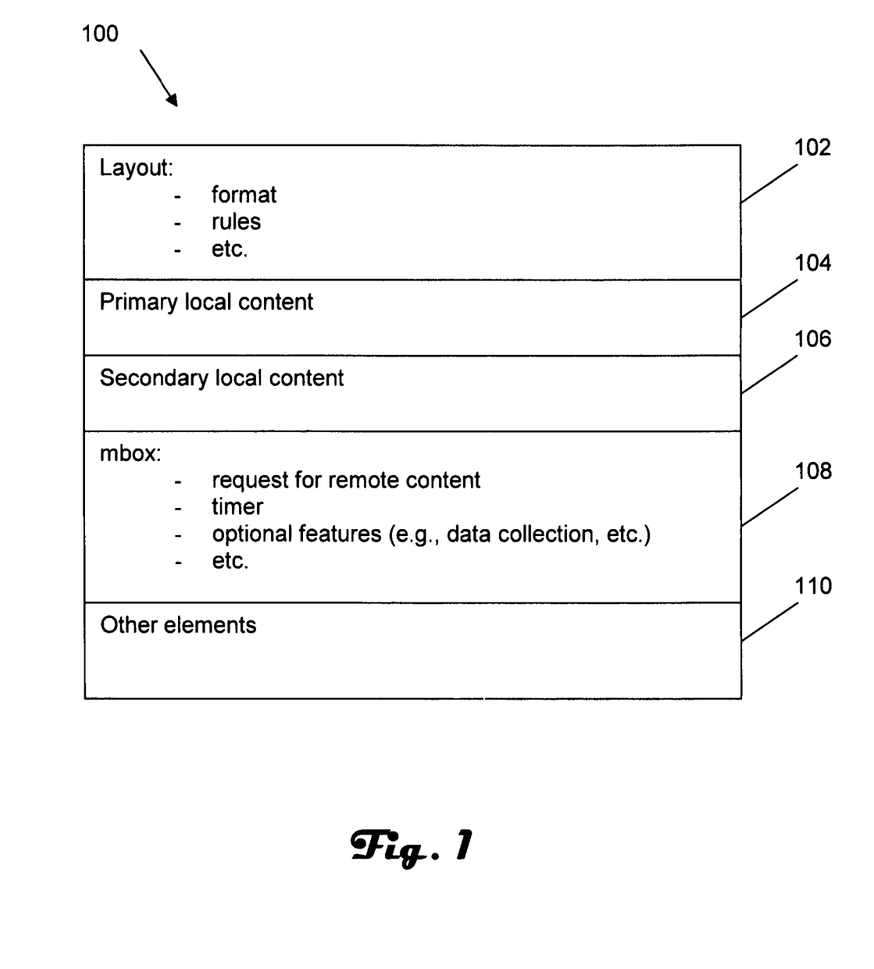
FIG. 1 is an illustration of selected elements of a file representing a webpage in which embodiments of the present invention may operate.

A typical file 100 includes a definition or information 102 concerning the layout of the webpage, such as the format of the webpage, the rules governing operation of and interaction with the webpage, primary local content 104, and secondary local content 106. The present invention utilizes aspects of a software component included with such a file called an mbox 108, details of which are provided in the aforementioned U.S. patent application Ser. No. 10/789,665, which is commonly assigned. Briefly, an mbox is a software component which enables the receiving, providing, and displaying of information from a remote source. An mbox is particularly tailored to enable the capturing of user data and merchandising data and storing such data at a remote storage. Application of an mbox in the context of the present invention is described further below.

Figure 2:
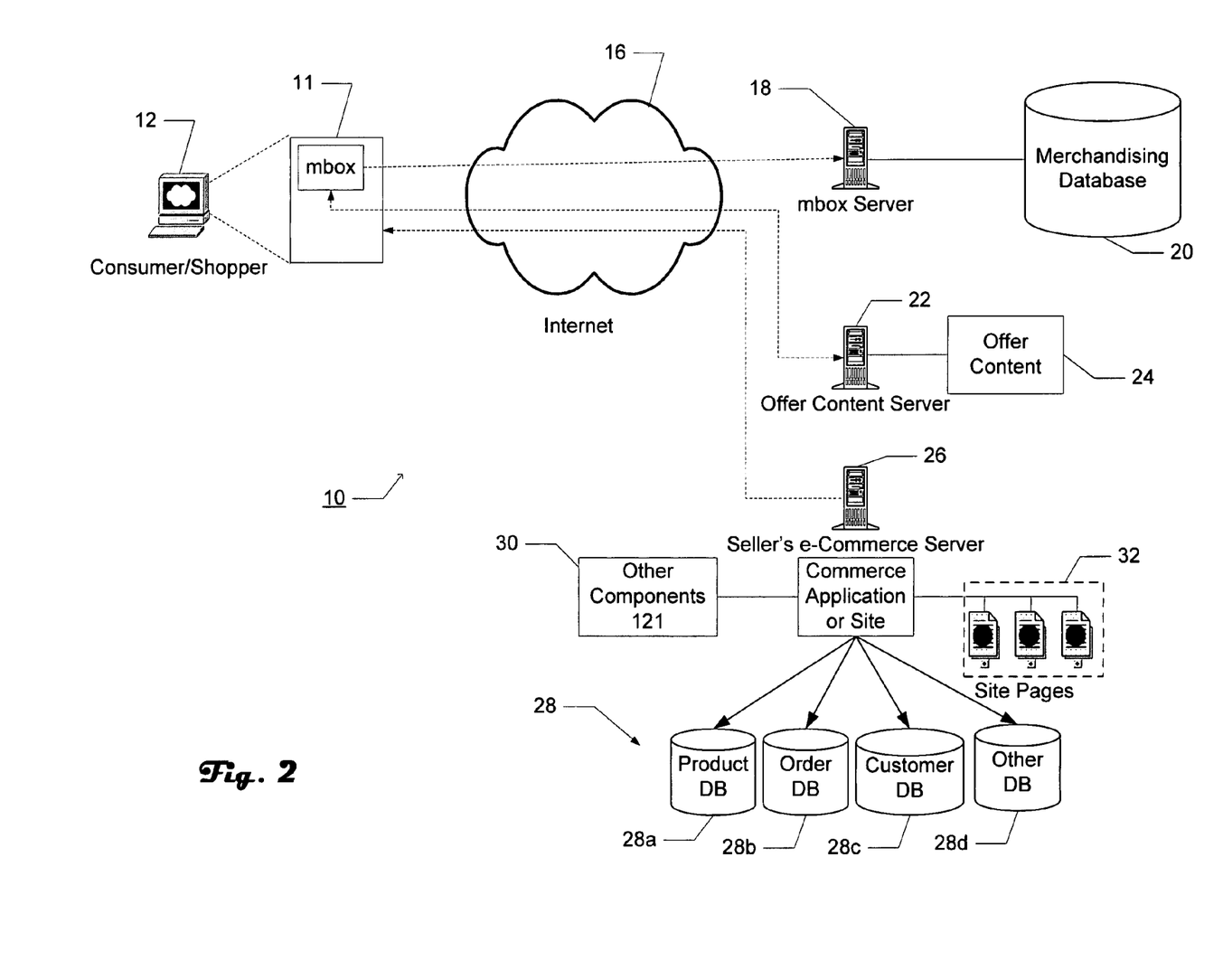
FIG. 2 is an illustration of an environment in which embodiments of the present invention may operate.

Referring now to FIG. 2, there is shown therein general components of a system 10 within which an embodiment of the present invention is intended to operate. As illustrated, the system includes: a processor-based display device (such as workstation, personal/portable computer, cell phone, PDA, etc.) 12, which may be operated for example by a consumer or shopper. A web browser application window 14, for presenting a webpage or similar structured file, may be presented on device 12. Communicating via the internet 16 with device 12 is a merchandising or mbox server 18, which collects merchandising data from device 12 and stores that data in a merchandising database 20. Server 18 may also include engines for analyzing the collected data and producing recommendations and results. Also in communication with processor-based display 12 is an offer content server 22 holding offer content 24 (e.g., product images, text, HTML, video, audio, or other media) used to present and promote products and promotions, and e-commerce server 26 supporting product sales. The operator of the e-commerce server 26, who may own, establish, support, and control the e-commerce server 26, is referred to herein as a seller. It may be worth noting that the mbox server 18 and the offer content server 22 do not necessarily receive separate requests from the mbox, but may for efficiency purposes both listen to and act upon a single request from the mbox (shown in browser window 14).

E-commerce server 26 further may include various databases 28 containing data that support product sales. These databases 28 typically include a product database 28a for storing product information, an order database 28b for storing purchase orders information, a customer database 28c for storing customer transaction histories, and possibly other databases 28d as appropriate for a seller's particular application.

Various other components of the seller's e-commerce server 26, which are not individually shown in FIG. 2 are depicted as block 30. The components of block 30 include, for example, a search engine and associated database for enabling users to interactively search the databases 28 for particular products, various order processing modules for accepting and processing orders, a shopping cart module to add and remove items from the user's shopping cart, etc.

Seller's e-commerce server 26 also contains definitions for a variety of webpages 32 which present the seller's products or services to a customer or shopper, and permit the customer or shopper to interact with the seller online. It is these webpages 32 which are presented in the aforementioned browser window 14, with content obtained in part from databases 28, and in part from a remote server, namely offer content server 22.

Webpages 32 are typically written to include content to be rendered or may be written to include a link to content so that when needed for display the user's display device requests the content from its source as identified in the link. Linked content may be stored "locally" on the sellers e-commerce server 26, for example in one of databases 28, or may be stored "remotely" from e-commerce server 26, for example on remote offer content server 22.

Figure 3:
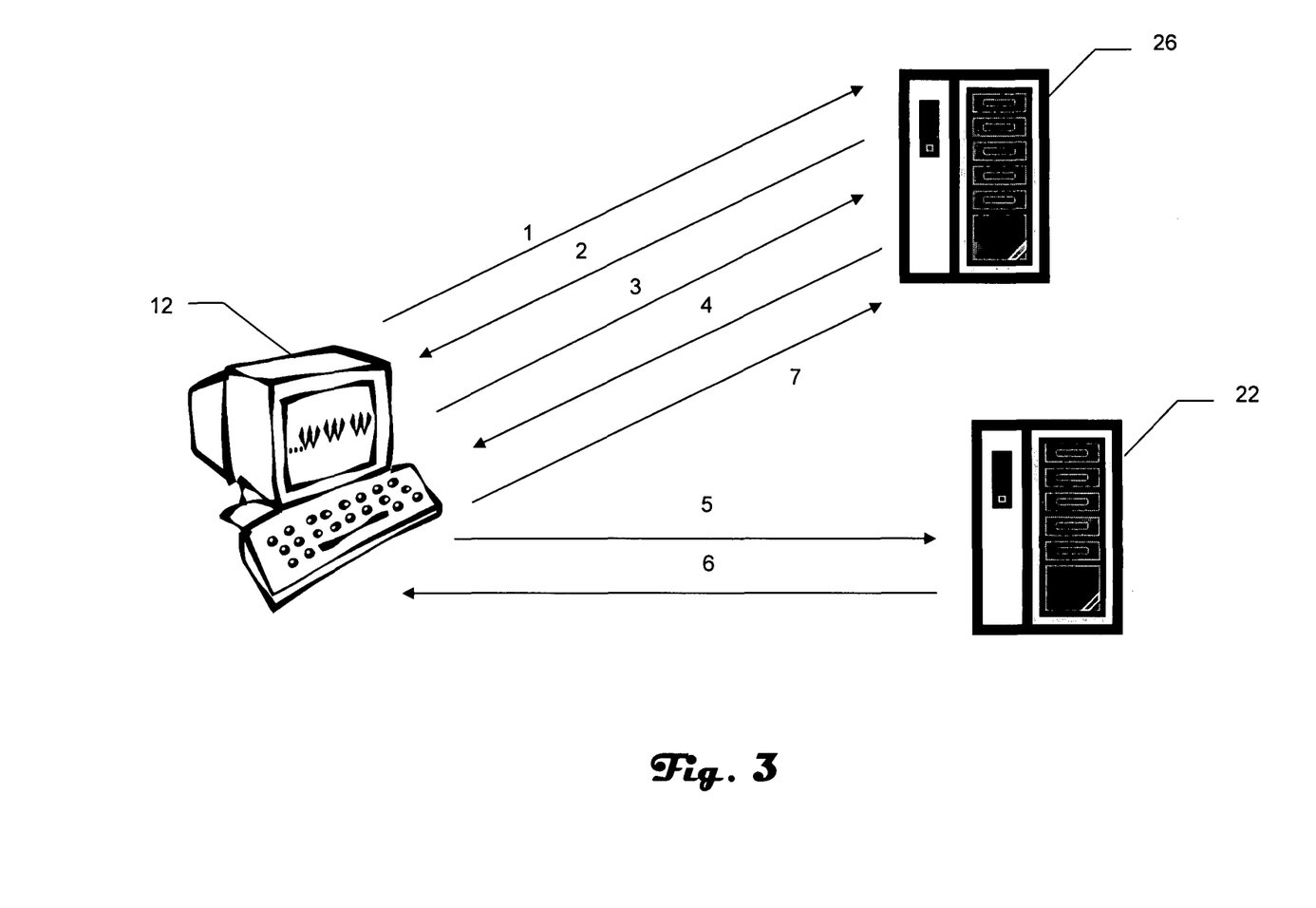
FIG. 3 is a block diagram of several elements of the system of FIG. 2, showing ordered communication pathways in a typical process according to one embodiment of the present invention.

FIG. 3 is a block diagram of several elements of the system of FIG. 2, showing ordered communication pathways in a typical process according to one embodiment of the present invention. A consumer/shopper operating display device 12 generates via a web browser (e.g., Microsoft® Internet Explorer™) a request for a webpage from a seller's website (step 1). Such a request is sent from device 12 to seller's e-commerce server 26. Upon receiving the request, e-commerce server 26 retrieves the definition of the webpage 32, any content required from databases 28, and any of a number of other software components associated with the requested webpage, and delivers same in the form of a file (e.g., one or more HTML pages, content, and components) to device 12 (step 2). In one embodiment, the file delivered by the e-commerce server 26 includes an "mbox" object. While many of the elements of the file delivered to device 12 are of a type well known in the art, the mbox has many novel arrangements and functions. As an example, the following HTML code in Table 1 which represents an mbox may be included in the file:

TABLE 1

```
<html>
    <head>
        <script src="mbox.js"></script>
    </head>
    <body>
    ...
    <div class="mboxDefault>
      Default Content here
    </div>
        <script>
            mboxCreate("exampleMbox");
        </script>
    ...
    </body>
</html>
```

Upon receiving the file representing the requested webpage, the user's Web Browser executes the HTML statements. One consequence of this execution is the request, from e-commerce server 26, for the file "mbox.js" (which is a library of Javascript codes) (step 3). Exemplary codes for the file "mbox.js" are incorporated herein as Appendix-1. The e-commerce server 26 in response provides the file "mbox.js" to device 12 (step 4).

The mboxCreate function (defined in mbox.js, for example) attempts to perform a Javascript "include" from a designated content server 22 (step 5). That is, additional Javascript (e.g., a file called "standard") is requested from a content server. As shown, and as typical, in the present example the content server is content server 22 which is logically remote (separate) from both device 12 and e-commerce server 26 server. In normal operation, the attempt to perform the Javascript "include" will succeed, and the content server 22 will provide the requested Javascript (which is a remote content and which may further define other remote content) to device 12 to modify the page file (i.e., the page to be displayed by the user's browser software) (step 6). Device 12 may then continue to load the rest of the webpage (e.g., images) from the e-commerce server 26 (step 7). The user's browser software controls the majority of these inter-device communications. Since most web browsers are threaded, step 7 may occur in parallel with one or more of the other steps 3-6. An example implementation of the file called "standard" is included herein as Appendix-2.

On occasion, the aforementioned "include" step fails to produce the desired results, for example failing to obtain some or all of the content or obtaining incompatible content. Some of the reasons for such a failure include, but are not limited to, the following:

The user's web browser application on device 12 does not support Javascript, or other scripting language in which the mbox codes are written;

The user's web browser application on device 12 does not support cookies, or has the cookies functionalities turned off (cookie functionality being required as part of one embodiment of the mbox.js code);

Content server 22 is inaccessible or unresponsive due to network problems or server problems;

Content server 22 is overloaded, preventing it from responding to device 12;

Content server 22 has actively disabled mboxes to proactively control its load;

Content server 22 is in a dumb failure mode (and/or debug mode) and responds immediately causing default content to be displayed.

In such cases, the web browser application on device 12 is incapable of fully rendering the seller's webpage. The result is that the web browser either completely fails to render the webpage or renders only those portions of the webpage it has received from server 26.

In other instances, when the network or content server 22 is overloaded or not optimally functioning, it may respond unusually slowly. In such cases, device 12 may "hang" while waiting for the network or server 22 to respond, although the device 12 may have already received a portion of that which is required for the user's web browser application to fully or partially render the seller's webpage.

Heretofore, the seller has had no influence over the user's web browser application in terms of whether to render a partial webpage nor how or when the web browser application decides to suspend waiting for a response and proceed with rendering as much of the requested webpage as it is able. In addition, neither the seller nor the content provider have been provided any control over what the user's web browser application renders in response to unavailable content or functionality.

Thus, according to an embodiment of the invention, in addition to those elements previously described as being provided by e-commerce server 26, secondary local content, together with attributes therefore, is delivered to device 12 together with the webpage definition at step 2. The secondary local content may be one or more images, text, links, etc., for the purpose of providing information, merchandising, etc. Furthermore, the secondary local content may be instructions (e.g., HTML) for rendering, such as where to render certain content, and what to render. In certain instances, the instructions provided may simply be to render nothing in the location in which the remote content would otherwise have been rendered.

Normally, the secondary local content is not rendered by the user's web browser application but rather held in reserve in the event that the remote content is not available. Should the network or content server 22 be inaccessible or insufficiently responsive, or the information returned be incompatible with the user's browser application, the secondary local content is accessed and presented by the user's web browser application in place of the unavailable remote content. The option of displaying this secondary local content permits a web page to be fully rendered, with content as well as a look and feel determined by the seller, when the remote content is otherwise unavailable.

The secondary local content has several key attributes. First, in one embodiment, it is contained in and provide to the user's display device as part of the provision of the seller's webpage file. In other embodiments, the secondary local content may be referenced by the webpage on the same server providing the webpage or referenced by the webpage on an alternative highly reliable server. Thus, if the seller's webpage is available to the user, by definition the secondary local content is also available. This obviates the dependence on a functioning connection to a remote server. Furthermore, if the seller's webpage is coded in a format displayable by the user's display device (i.e., web browser) the secondary local content will also be in a format displayable by the user's display device, thus addressing the case that while the seller's webpage file is compatible with the display device, the remote content is not.

Second, the secondary local content is authored by the seller (or on behalf of the seller), and thus may be made specific to the content of the seller's webpage (and hence interest of the user). This is in contrast to the current default for unavailable or incompatible content of a generic icon, if any, provided by the user's web browser application.

Third, the seller is provided with the opportunity to define when (as well as what and where) the secondary local content is displayed in place of the remote content.

Figure 4:
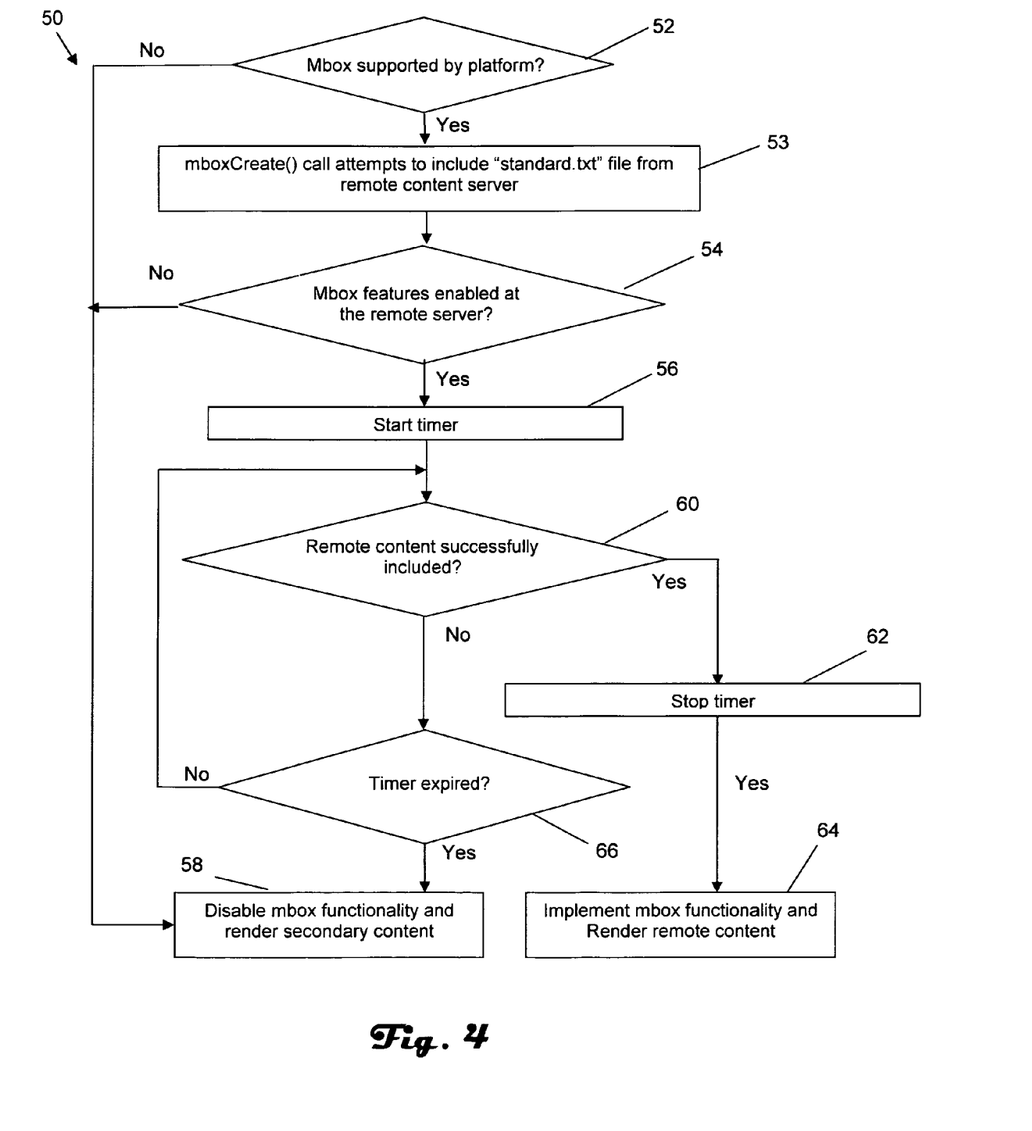
FIG. 4 is a flow diagram illustrating one embodiment of the present invention.

Attention now turns to FIG. 4, which depicts operations of a timer mechanism according to an embodiment of the invention. Specifically, code is provided with the seller's webpage file, e.g., as part of the mbox.js file, which implements a timer on the user's display device. Initially, a process check is made at step 52 to determine if mboxes are supported by the platform (e.g., whether cookies, Javascript or other browser features required for mbox functionality are supported and available). If not, certain functionalities of the mbox code may be disabled, and the secondary local content is rendered in the location(s) intended for the remote content, step 58.

If the mbox is supported by the platform, mboxCreate function attempts to "include" a filed called "standard" from a remote server at step 53. If the remote server (e.g., offer content server 22) is unavailable, or if the remote server is unable to return the requested content (e.g., mbox features are disabled at the offer content server 22), the attempt to "include" will fail, as determined at step 54. If so, certain functionalities of the mbox code may be disabled and the secondary local content rendered in the location(s) intended for the remote content, step 58.

If the attempt to create/initiate the "include" of remote content does not fail, the mbox code creates and starts a timer at step 56. The length of time the timer runs may be determined by the seller in programming the mbox, or by the operator of the offer content server 22.

If during the run time of the timer remote content is successfully retrieved from the remote server, the timer is stopped at step 62. In one embodiment, the last line of the file "standard" functions to stop the timer. Thus, the stopping of the timer ensures that the necessary remote content is all retrieved from the content server 22. Then, the remote content may then be rendered at step 64 together with the balance of the webpage retrieved from server 26 and other content as appropriate. Any other functionality dependent upon the availability of the remote content may then also be activated, if appropriate. However, if the content received from the remote server is incomplete (for instance because the connection is too slow or because the content server is overloaded), or otherwise not displayable (e.g., corrupted), the timer will continue to run awaiting further receipt of compatible content. If the timer has not timed out, as determined at step 66, the user's web browser will continue to await receipt of compatible content. If the timer has timed out, certain functionalities of the mbox code may be disabled and the secondary local content rendered in the location(s) intended for the remote content at step 58.

According to one embodiment of the present invention, the length of time which the timer counts can be set such that the determination of whether remote content is available is approximately the amount of time (e.g., one to several seconds) a user would typically wait for the rendering of a webpage with a moderately fast network connection. Thus, in cases where the secondary local content is ultimately displayed, a user might otherwise be unaware that the remote content in unavailable. Alternatively, the timer may be set to a longer time (e.g., tens of seconds or longer) to anticipate users communicating through relatively slow dial-up connections.

According to a further embodiment of the invention, secondary local content may be displayed while the browser application awaits receipt of the remote content. If the remote content arrives, the secondary local content is replaced by the remote content. The transition from secondary local content to remote content may be structure to appear to the user that such a transition was intended as part of the webpage design. If the remote content fails to arrive by the expiration of the time determined by the timer, the secondary local content continues to be displayed, and the user remains unaware that the remote content in unavailable.

According to yet another embodiment of the invention, the default content may be specified as part of the mbox request (e.g., a request generated by the mbox code). Specifying the default content in the request allows the author of the webpage to specify different default content for each of the mboxes. If default content needs to be served, it is simple to obtain the default content from the request, even if the offer content server is unavailable.

Figure 5:
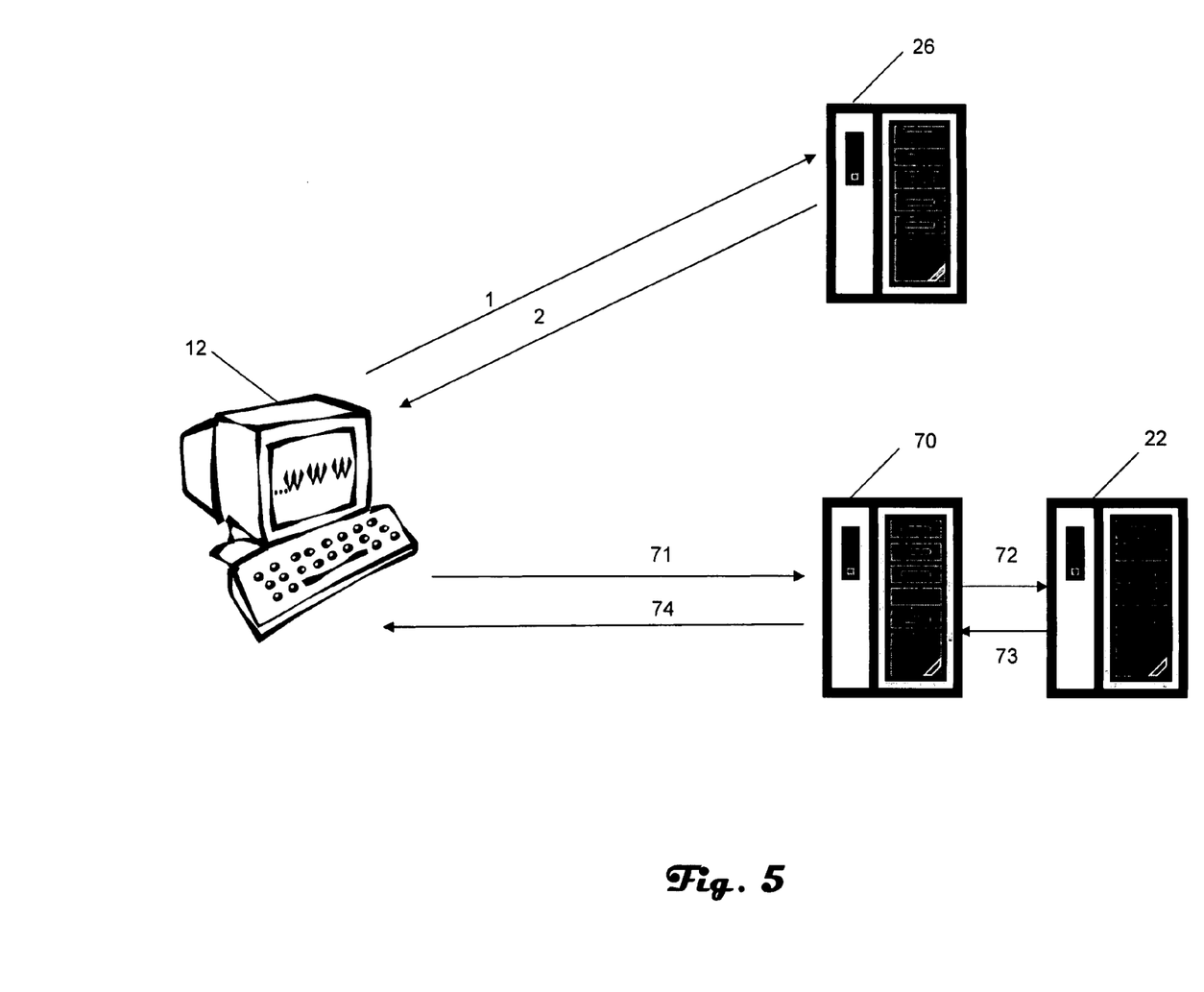
FIG. 5 is a block diagram of several elements of the system of FIG. 2, showing ordered communication pathways in a typical process according to another embodiment of the present invention.

FIG. 5 is a block diagram showing ordered communication pathways among several elements of the system of FIG. 2 in a typical process according to one embodiment of the present invention. In this embodiment, a proxy server or load balancer 70 is placed in front of offer content server or servers 22. The proxy server 70 is configured to determine if the offer content server 22 is available and serving content in a timely fashion. Furthermore, the proxy server 70 is configured to extract default content (or the location of the default content) from the mbox request, and to provide the default content to the device 12 if the offer content server 22 is not serving content in a timely manner.

As depicted in FIG. 5, a consumer/shopper operating display device 12 generates via a web browser a request for a webpage from a seller's website (step 1). Such a request is sent from device 12 to seller's e-commerce server 26. Upon receiving the request, e-commerce server 26 sends/delivers the requested webpage to device 12 (step 2). As an example, the following HTML code in Table 2 may be included in the file:

TABLE 2

```
<html>
...
<body>
...
<img
src="http://mbox3.offermatica.com/m2/demo/ubox/image
?mbox=test&param1=value&mboxDefault=http%3
A//offermatica.com/img/logo.gif">
...
</body>
</html>
```

Upon receiving the file representing the requested webpage, the user's Web Browser executes the HTML statements.

Another consequence of this execution is an image request from offer content server 22 through proxy server 70, as specified by "http://mbox3.offermatica.com/m2/demo/ubox/image?mbox=test&param1=value&mboxDefault=http%3A//offermatica.com/img/logo.gif" (step 71). Upon receiving this request and under normal operations, the proxy server 70 passes along the request to the offer content server 22 (step 72), and the offer content server 22 responds with the appropriate content (step 73).

In some instances, the proxy server 70 may determine that the offer content server 22 is unavailable or does not respond in a sufficiently timely manner. In those instances, the proxy server 70 attempts to retrieve the default content specified in the mbox request. In this example, if failure is detected in the offer content server 22, the "img" request is redirected to: "http://offermatica.com/img/logo.gif", for example, using the HTTP status code 302 Page Moved. Note that the location of the default content is already provided in the mbox request. The proxy server 70 then provides the appropriate content (e.g., content from server 22 under normal operating conditions, or default content as specified by the request if failure is detected) to the device 12 (step 74).

It should be noted that the embodiment illustrated in FIG. 5 is particularly appropriate for images, web page URLs, javascript (without a library), Macromedia Flash (with or without a Flash library), movies and client side Java. Nevertheless, the embodiment is appropriate for other types of default content as well.

In yet another embodiment of the invention, one or more servers that know how to server default content based on the mbox request are provided. In this embodiment, if the offer content server 22 fails, the mbox request is redirected to these servers using standard geographic failover solutions (e.g., updating DNS entries, BGP).

According to yet another embodiment of the invention, the mbox code may start a timer, and the proxy server placed in front of the offer content server may be configured to respond with codes that short-circuit the timer, causing default content (e.g., secondary local content that is part of the page) to be immediately displayed. An advantage of this solution is that, in the event the offer content server is down, the device 12 does not have to wait for the timeout period to pass before default content is displayed. Furthermore, if the offer content server is overloaded, the proxy server can proactively disable requests for remote content. In this embodiment, the response from the proxy server may be fixed, since the default content is defined on the webpage.

While a plurality of preferred exemplary embodiments have been presented in the foregoing detailed description, it should be understood that a vast number of variations exist, and these preferred exemplary embodiments are merely representative examples, and are not intended to limit the scope, applicability or configuration of the invention in any way. For example, in the discussion above it has been assumed that the remote content is displayable content. However, the remote content may be instructions (e.g., HTML) intended to cause an action on device 12, with or without visible effect from the user's perspective. Thus, the foregoing detailed description provides those of ordinary skill in the art with a convenient guide for implementation of the invention, and contemplates that various changes in the functions and arrangements of the described embodiments may be made without departing from the spirit and scope of the invention defined by the claims thereto.

What is claimed is:

1. A method of displaying a content page on a display device of a client, the method comprising:
    requesting, by the client, from a content page server via a network, a content page;
    receiving, by the client, from the content page server via the network, in response to the request, one or more files containing a definition of the content page, primary local content to be displayed in a first portion of the content page, secondary local content to be displayed in a second portion of the content page, and a software component comprising executable instructions for requesting remote offer content for promoting at least one product from a remote offer content server and for capturing merchandising data from the client; and
    executing, by the client, said software component in connection with rendering the content page on the display device, wherein rendering the content page includes displaying the primary local content in the first portion of the content page, and wherein executing the software component causes the client to:
    request the remote offer content from the remote offer content server via the network;
    initiate a timer;
    display said remote offer content in said second portion of the content page if said remote offer content is received by the client before expiration of the timer or display said secondary local content in said second portion of the content page instead of the remote offer content if said remote offer content is not received by the client before expiration of the timer; and
    capture the merchandising data from the client relating to the content page and transmit the merchandising data to a merchandising server for storage in a merchandising database, wherein the merchandising server and the remote offer content server are each logically remote from the content page server.

2. The method of claim 1, wherein the definition comprises:
    code defining a layout of the content page; and
    rules governing operation of and interaction with the content page.

3. The method of claim 1, wherein said software component further comprises instructions that when executed cause the client to immediately display said secondary local content in the second portion of the content page in response to receiving a signal indicating that the remote offer content is unavailable.

4. The method of claim 1, wherein the software component further comprises instructions that when executed by the client cause the client to display said secondary local content in said second portion of said content page prior to receiving said remote offer content, and replace the secondary local content with the remote offer content in the second portion of said content page if the remote offer content is received by the client.

5. The method of claim 3, wherein said signal is provided by a proxy server located between said remote offer content server and the client.

6. A method for serving a content page, the method comprising:
    receiving, at a content page server via a network, a request from a client for a content page, wherein the client comprises a display device; and
    sending from the content page server to the client via the network, in response to the request, one or more files containing a definition of the content page, primary local content to be displayed in a first portion of the content page when the client renders the content page on the display device, secondary local content to be displayed in a second portion of the content page, and a software component comprising executable instructions that when executed by the client in connection with rendering the content page on the display device cause said client to:
    request remote offer content for promoting at least one product from a remote offer content server via the network;
    initiate a timer;
    display said remote offer content in the second portion of the content page if said remote offer content is received by the client before expiration of the timer, or display said secondary local content in said second portion of the content page instead of the remote offer content if said remote offer content is not received by the client before expiration of the timer; and
    capture merchandising data from the client relating to the content page and transmit the merchandising data to a merchandising server for storage in a merchandising database, wherein the merchandising server and the remote offer content server are each logically remote from the content page server.

7. The method of claim 6, wherein the definition comprises:
    code defining a layout of the content page; and
    rules governing operation of and interaction with the content page.

8. The method of claim 6, wherein said software component further comprises instructions that when executed cause the client to initiate, prior to expiration of the timer, display of said secondary local content in said second portion of the content page instead of said remote offer content in response to receiving, prior to expiration of the timer, a signal indicative of said remote offer content being unavailable.

9. The method of claim 8, wherein said signal is provided by a proxy server located between said remote offer content server and said client.

10. The method of claim 6, wherein the software component further comprises instructions that when executed by the client cause the client to display said secondary local content in said second portion of said content page prior to receiving said remote offer content, and replace the secondary local content with the remote offer content in the second portion of said content page if the remote offer content is received by the client.

11. A method for serving a content page, the method comprising:
    receiving, at a content page server via a network, a request from a client for a content page, wherein the client comprises a display device; and sending from the content page server to the client via the network, in response to the request, one or more files containing a definition of the content page, primary local content to be displayed in a first portion of the content page when the content page is rendered on the display device, and a software component comprising executable instructions that when executed by the client in connection with rendering the content page cause said client to:

request remote offer content for promoting at least one product from a remote offer content server;

display said remote offer content in said second portion of said content page if the remote offer content is received by the client, or retrieve secondary local content from the content server and display said secondary local content in the second portion instead of the remote offer content if the remote offer content is not received by the client; and capture merchandising data from the client relating to the content page and transmit the merchandising data to a merchandising server for storage in a merchandising database, wherein the merchandising server and the remote offer content server are each logically remote from the content page server.

12. The method of claim 11, wherein the software component further comprises instructions that when executed by the client cause the client to:

initiate a timer; and display said remote offer content in said second portion of said content page if said remote offer content is received prior to expiration of the timer, or display said secondary local content in said second portion of said content page if said remote offer content is not received prior to expiration of said timer.

13. The method of claim 12, wherein the software component is further comprises instructions that when executed by the client cause the client to display said secondary local content in said second portion of said content page in response to receiving a signal indicative of said remote offer content being unavailable.

14. The method of claim 13, wherein said signal is provided by a proxy server located between said remote offer content server and said client.

15. The method of claim 11, wherein the software component further comprises instructions that when executed by the client cause the client to retrieve the secondary local content from the content server and display said secondary local content in said second portion of said content page prior to receiving said remote offer content, and replace the secondary local content with the remote offer content in the second portion of said content page if the remote offer content is received by the client.

* * * * *